July 18, 1950 G. W. STODDARD 2,515,808
CORN PICKING MACHINE
Filed Oct. 31, 1946 4 Sheets-Sheet 1

INVENTOR
Glen W. Stoddard
BY Rudolph L. Lowell
ATT'Y.

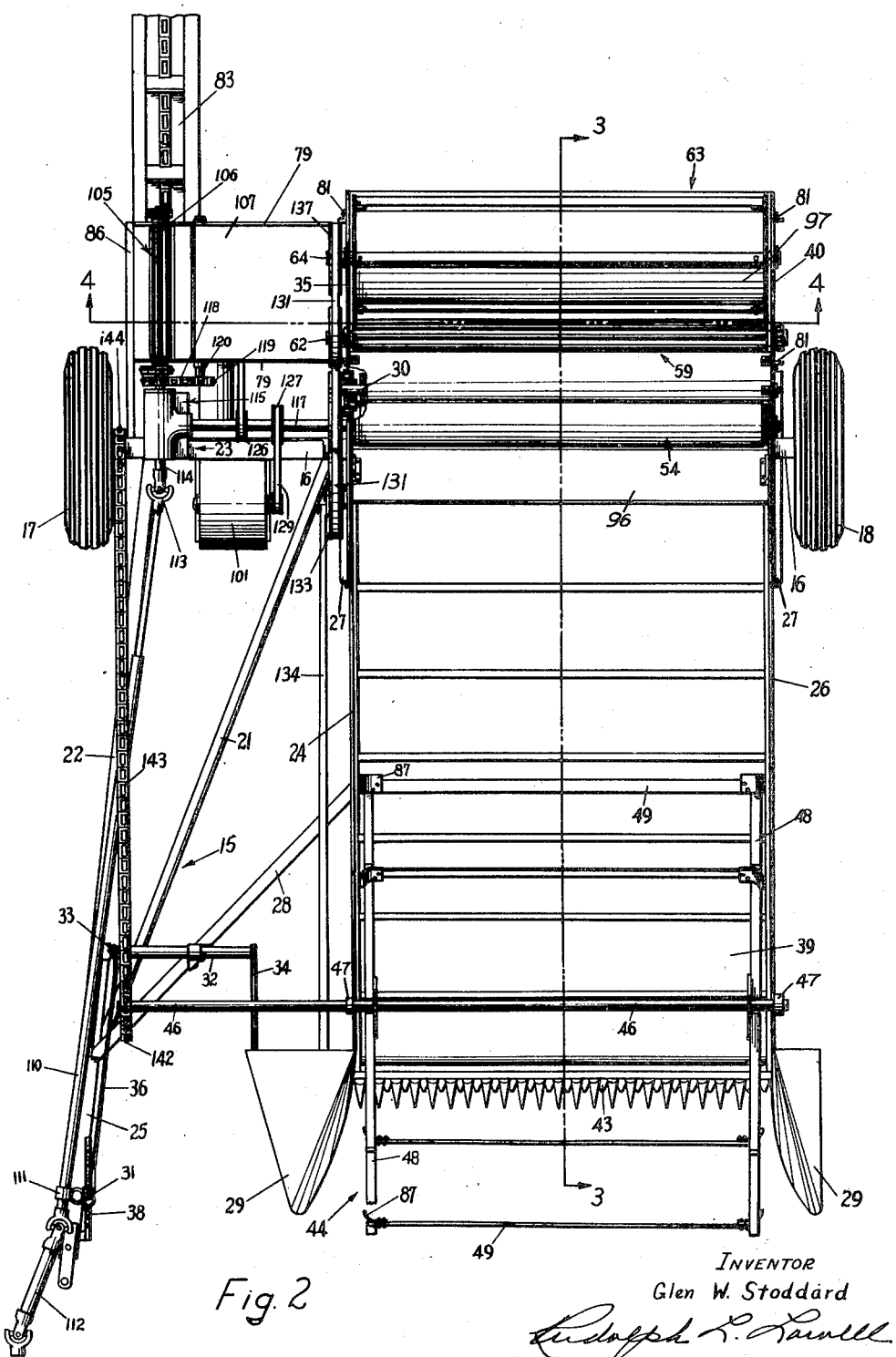

July 18, 1950        G. W. STODDARD        2,515,808
CORN PICKING MACHINE
Filed Oct. 31, 1946        4 Sheets-Sheet 3
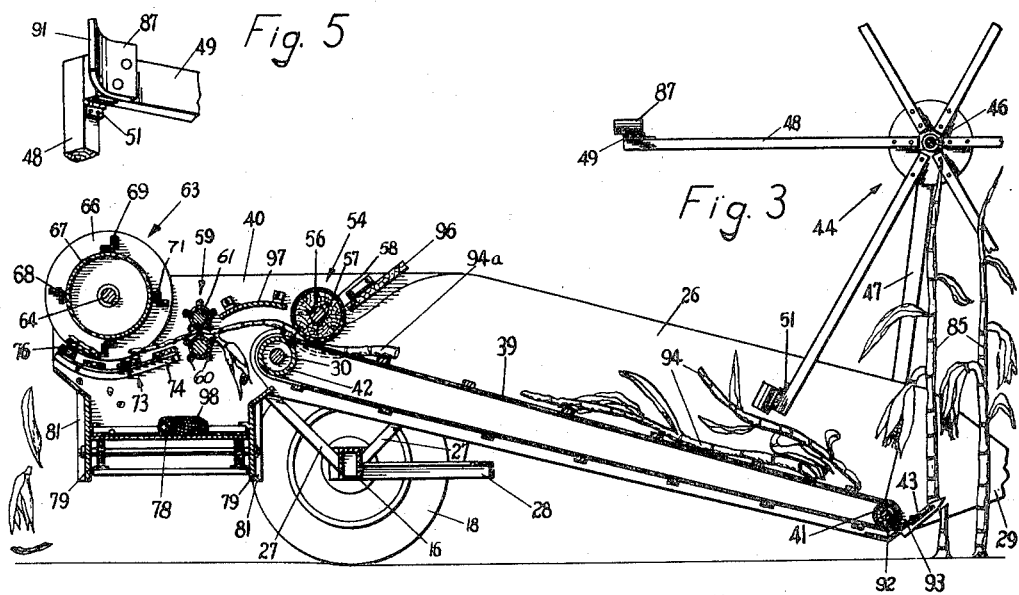
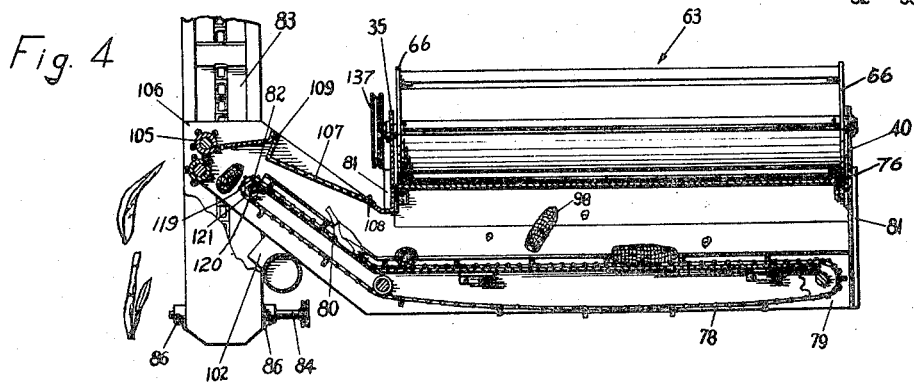
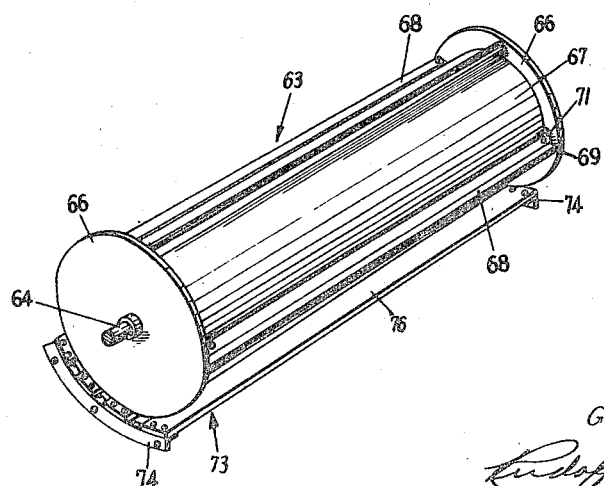
INVENTOR
Glen W. Stoddard
BY    Rudolph L. Lowell
ATTY.

July 18, 1950  G. W. STODDARD  2,515,808
CORN PICKING MACHINE
Filed Oct. 31, 1946  4 Sheets-Sheet 4

INVENTOR
Glen W. Stoddard
BY Rudolph L. Lowell
ATTY.

Patented July 18, 1950

2,515,808

UNITED STATES PATENT OFFICE 2,515,808

CORN PICKING MACHINE

Glen W. Stoddard, Grant Township, Tama County, Iowa

Application October 31, 1946, Serial No. 706,917

5 Claims. (Cl. 56—64)

This invention relates generally to corn picking machines and in particular to a pull type corn picking machine in which the ears are removed from cut stalks.

Corn picking machines now in general use, of either the pull type or mounted type, usually include a pair of longitudinally extended snapping rolls arranged between a pair of snouts or wings. In operation, the snouts are guided to each side of a row of corn and the ears are snapped by the snapping rolls from the standing stalks. The snapped ears are then carried to a husking mechanism and the husked ears removed from the machine by a wagon elevator apparatus.

These machines, although generally satisfactory in operation, require considerable care in the guiding of the snouts along a row of corn. A further objection is found in the fact that the snapping rolls have a tendency to shell small ears, and even large ears under wet weather conditions. In many cases the small ears are entirely crushed so as to be completely lost to the harvest. Generally no provision is made for harvesting the corn shelled by the snapping rolls and this corn usually just drops between the rolls to the ground.

Let another objection is found in the fact that many stalks are not upright and lean at various angles in the row. As a result some of these stalks do not pass between the snouts, or are struck by the snouts with sufficient force to shake loose some of the ears. The ears thus loosened are not harvested but fall to the ground ahead of the machine.

It is an object of this invention, therefore, to provide an improved corn picking machine.

A further object of this invention is to provide a corn picking machine capable of gathering ears from leaning stalks, and adapted to operate on two or more rows of corn at one time without requiring a careful guiding of the machine along the rows.

Yet another object of this invention is to provide a corn picking machine which will harvest the corn shelled during picking and husking operations.

A still further object of this invention is to provide a corn picking machine which acts to efficiently remove both large and small ears from the stalks under varying weather conditions.

Yet another object of this invention is to provide a corn picking machine which is light in weight, capable of being operated at a relatively high speed of travel, efficient in operation to pick corn of varying sizes, and having all of the working parts thereof readily accessible for maintenance and service purposes.

A feature of this invention is found in the provision of a corn picking machine in which cut stalks are gathered on an upwardly and rearwardly extended conveyor. Spaced rearwardly from the top end of the conveyor is a pair of combination husking and picking rolls for receiving the cut stalks from the conveyor. The fodder or stalks discharged by the rolls drops to the ground rearwardly of the machine and the picked corn drops on a transverse conveyor below the rolls for delivery to a wagon elevator.

A further feature of this invention is found in the provision of a corn picking machine in which cut stalks are first delivered to a pair of combination husking and picking rolls and then between a beater roll and a concave for separating shelled corn from the stalks. The stalks are discharged from the rear end of the machine and the picked and shelled corn are received on a common conveyor for delivery to a wagon elevator.

A still further feature of this invention is found in the provision of a corn picking machine in which cut stalks are first delivered for passage through combination picking and husking rolls. The picked corn and any stalks not passed through the combination rolls, drop on a common conveyor. The stalks on the conveyor are directed through a second pair of combination husking and picking rolls arranged relative to the discharge end of the conveyor such that the picked corn on the conveyor and the corn picked by the second rolls fall together into a wagon elevator.

Another feature of this invention is found in the provision of a corn picking machine in which a stalk cutting means and a reel are of a construction, and assembled relative to the forward end of an upwardly and rearwardly inclined stalk carrying conveyor, such that the stalks, on being cut, are deflected and guided to fall rearwardly onto the conveyor.

Further objects, features and advantages of this invention will become apparent from the following description when taken in connection with the accompanying drawings, in which:

Fig. 2 is a top view of the machine;

Fig. 3 is a reduced longitudinal sectional view of the machine as seen along the line 3—3 in Fig. 2;

Fig. 4 is a reduced transverse sectional view taken along the line 4—4 in Fig. 2, with certain parts broken away for the purpose of clarity.

Fig. 5 is a detail perspective view of the reel;

Fig. 8 is a perspective view of a beater roll and a cooperating concave for removing shelled corn from the fodder or picked stalks.

Figure 1:
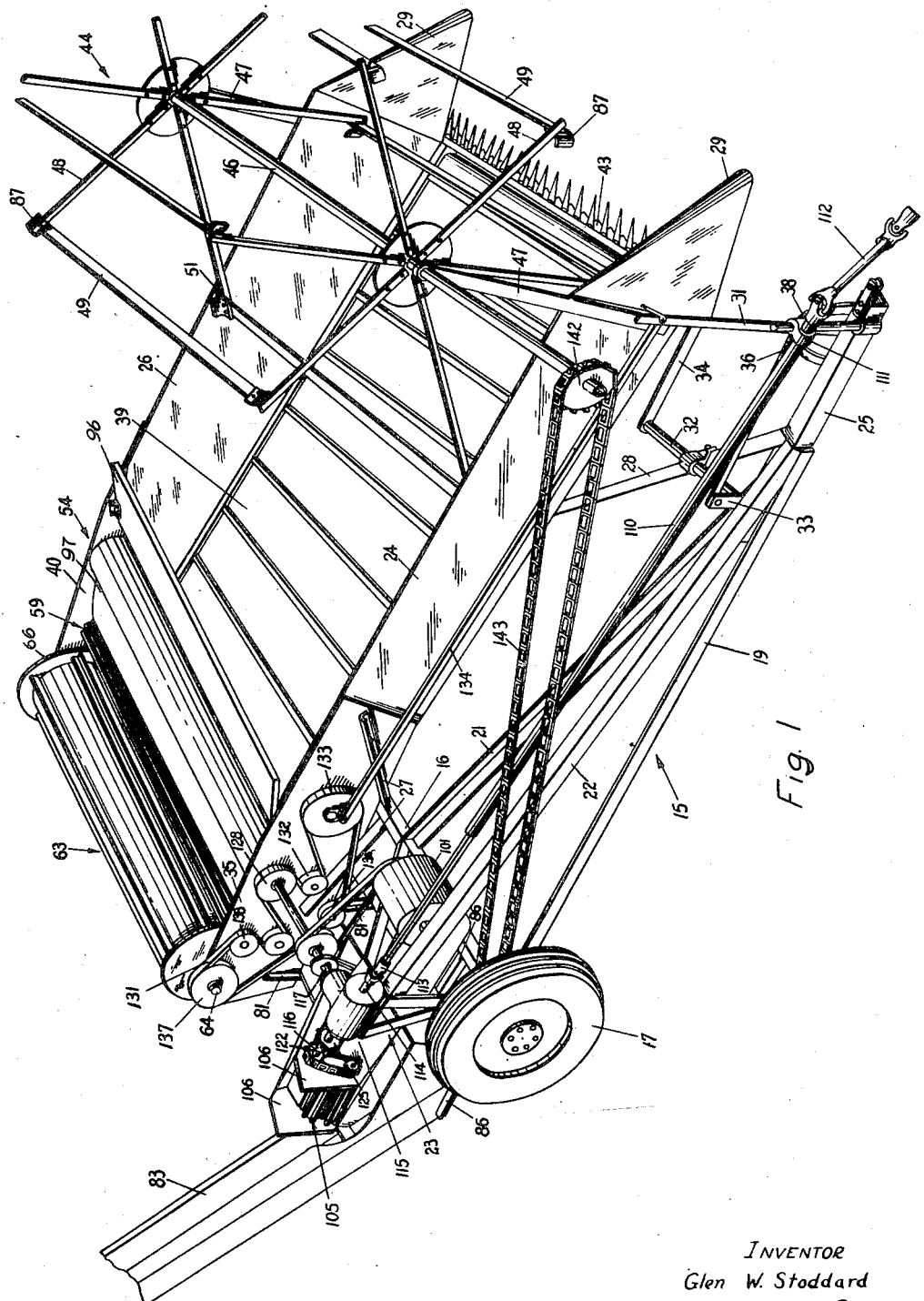
Fig. 1 is a perspective view of the corn picking machine of this invention.

With reference to the drawings, the corn picking machine of this invention is illustrated in Figs. 1 and 2 as having a supporting frame, designated generally as 15, including a wheel axle 16 for a pair of ground wheels 17 and 18. A tongue structure, formed as part of the main frame, is comprised of longitudinal frame members 19, 21 and 22, with the rear ends of the members 19 and 21 being connected in a spaced relation to the axle 16 adjacent to the wheel 17, while the rear end of the frame member 22 is connected to an upright frame 23 carried on the axle between the rear ends of the frame members 19 and 21. The members 19 and 22 are in substantially the same vertical plane and all three of the members 19, 21 and 22 converge forwardly of the machine for connection of their front ends with a common tongue member 25 adapted to be hitched to a usual farm tractor (not shown). An inclined brace member 28 (Figs. 1 and 3) is connected between the tongue member 25 and the axle 16 at a position near the ground wheel 18.

A pivoted apron frame includes a pair of upright transversely spaced wall members 24 and 26 (Figs. 1 and 2) arranged between the tongue structure and the ground wheel 18. The beam members 24 and 26 are suitably connected together by cross brace members (not shown) and are pivotally supported near their rear ends on a transverse shaft 30 rotatably supported on transversely spaced upright side frame members 35 and 40, which are mounted on brace or support members 27 carried on the axle 16. Snouts or corn stalk guiding shields 29 are provided on the front ends of the apron wall members 24 and 26.

It is seen, therefore, that the apron frame which includes the wall members 24 and 26 is pivotally movable relative to the shaft 30 to provide for the adjustment of the apron frame relative to the ground surface. This adjustment is accomplished in a usual manner by the provision of a manually operated lever 31 (Figs. 1 and 2) pivotally supported at its lower end on the tongue member 25. A transverse rock shaft 32, rotatably supported on the brace member 28, and on the tongue member 25, has rock arms 33 and 34 mounted at its opposite ends. The free end of the rock arm 33 and the lever 31 are pivotally connected together by a link member 36, while the free end of the rock arm 34 is in pivotal connection (not shown) with the guide member 29 at the front end of the apron side or wall member 24.

On manipulation of the lever 31 the apron frame is pivotally moved in an up and down direction relative to the shaft 30, and is held in an adjusted position by a usual pawl and segment assembly illustrated generally as 38.

A conveyor or apron 39 (Figs. 1 and 3) is of a usual endless type and is movably supported between the apron side walls 24 and 26 on a lower draper or roller 41 and an upper roller 42, so as to be inclined in a downward and forward direction. The pivot shaft 30 constitutes the shaft for the upper roll 42.

The machine further contemplates the use of a usual type sickle bar or cutter 43 which is supported between the front ends of the apron side walls 24 and 26 and forwardly of the conveyor 39. The cutter 43, as best appears in Fig. 3, is extended upwardly and forwardly at an angle of about 45° relative to the longitudinal axis of the conveyor 39. In other words, the cutter 43 is inclined upwardly and forwardly relative to a plane common to the axes of the rollers 41 and 42 for the conveyor 39.

Supported above the sickle bar 43 is a reel, designated generally as 44 (Figs. 1 and 3) having a shaft 46 rotatably supported at the upper ends of upright members 47 mounted on the apron wall members 24 and 26. The shaft 46 is substantially vertically above the cutter 43.

The reel includes the usual strut or radial arms 48 and paddles 49 connected between each pair of opposite struts 48. In one embodiment of the invention the reel 44 has a diameter of about eight feet while the paddles 49 are about four inches wide.

The inner sides of the paddles 49 are in hinged connection, as indicated at 51, with the free ends of the struts 48 so as to be movable pivotally downwardly, in response to the action of gravity, out of parallel alignment with their corresponding struts 48 on movement from their uppermost positions on the reel to their lowermost positions on the reel. The paddles 49 are thus in positions flat against their corresponding struts during a substantially one hundred and eighty degree rotation from their lowermost positions to their uppermost positions. As the paddles 49 begin movement from their uppermost positions, they fall forwardly away from the strut so as to be swingable thereon until they again reach their lowermost positions.

Positioned above the rear or top end of the conveyor 39 is a feeder roll 54 (Fig. 3). The roll 54 has a shaft 56 rotatably supported in the frame members 35 and 40, upon which is mounted a cylindrical body member 57 composed of a wooden material and provided with a peripheral covering 58 formed of a canvas or like material.

The feeder roll 54 is about six inches in diameter and the upper roll 42 is of a slightly smaller diameter to facilitate the travel of the conveyor 39 at a speed substantially equal to the peripheral travel of the feeder roll 54.

Figure 7:
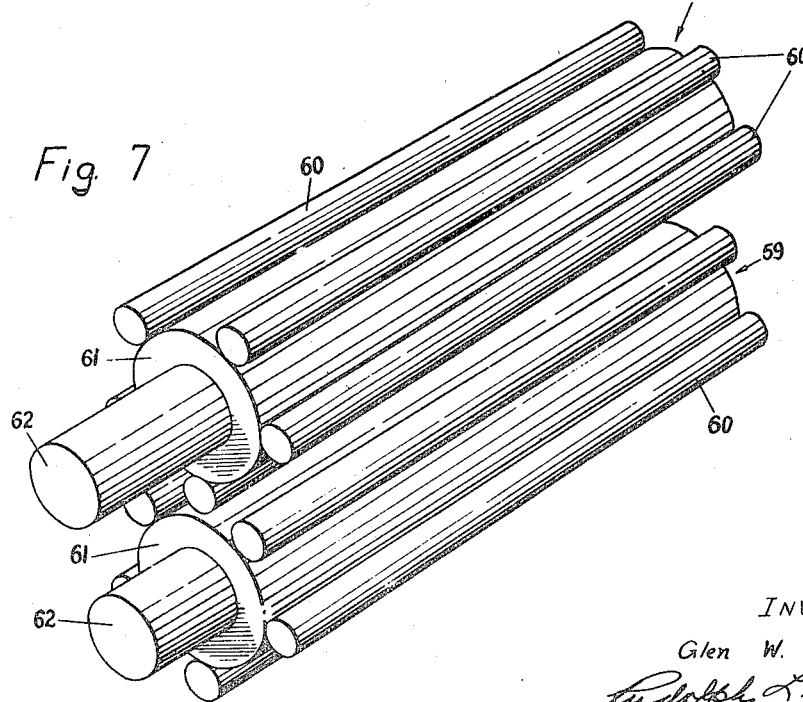
Fig. 7 is a perspective view of a pair of combination picking and husking rolls forming part of the corn picking machine.

Spaced rearwardly from the upper end of the conveyor 39 is a pair of vertically spaced combination picking and husking rolls 59 which are of a like construction. The rolls 59 (Figs. 3 and 7) are of a metal construction and include cylindrical body members 61 provided at their opposite ends with stub shafts 62 which are rotatably supported in the frame members 35 and 40. Angularly spaced about the body member 61 are longitudinally extended rod or rib members 60. In one embodiment of the invention the body members 61 are about one and a half inches in diameter and the rod members 60 are three-eighths of an inch in diameter with five of such rods being carried on each body member as illustrated in Fig. 7.

The rolls 59 are relatively arranged in the corn picker machine in a vertically spaced relation (Fig. 3) such that the body member 61 on one of the rolls is spaced about a half an inch from a rod 60 carried on the other of the rolls, when such rod is positioned between the body members 61. Further, it is contemplated that the axis of the upper one of the rolls 59 be in a plane substantially common to the upper length of the conveyor 39.

In order to separate any shelled corn from the stalks ejected from between the combination rolls 59, there is provided a separator mechanism which includes a beater roll 63 having a shaft 64 rotatably supported between the side frame members 35 and 40 at a position spaced rearwardly from the combination rolls 59 (Figs. 3 and 8). A tubular metal drum 67 is carried on the shaft 64 between discs 66 for rotatable support on a series of angularly spaced angle irons 68, arranged in a circle between the disc members 66 and having one of their legs 69 arranged in planes extended radially of the shaft 64. It is seen, therefore, that the tubular drum 67 is in a concentric relation with the shaft 64 and supported for rotation between the legs 71 of the angle members 68. In one embodiment the discs 66 are about fourteen inches in diameter and the tubular drum 67 being about eleven inches, with the angle members 68 being about 1½" x 1½". Four angle members 68 are illustrated in the drawings but this number may be varied.

Cooperating with the beater roll 63 in the separation of shelled corn from the fodder is a concave or grate 73 arranged in a spaced relation below the beater roll 63. The concave 73 includes a pair of angle members 74 (Figs. 3 and 8) oppositely arranged on the side frame members 35 and 40.

Connected between the angle members 74 are a series of flat members 76, which are about four inches wide and spaced about one inch apart on the angle members 74. The upper surfaces of the flat members 76 are spaced about an inch below the under side of the beater roll disc members 66.

Extended transversely of the machine, at a position rearwardly of the axle 16 and below the beater roll 63 and combination rolls 59, is a second conveyor 78, Figs. 3 and 4, having side frame members 79 supported on bracket members 81 which are carried on the side frame members 35 and 40. That section of the elevator 78, located below the beater roll 63 and combination rolls 59, extends in a substantially horizontal plane and is continuous with a discharge section 80 which is inclined upwardly and laterally toward the ground wheel 17. The discharge end 82 of the inclined conveyor section 80 is located above the lower end of a usual wagon elevator 83, with such lower end being pivotally supported on a shaft 84 carried on a pair of longitudinal frame members 86 supported on and extended rearwardly from the machine axle 16 at a position adjacent to the ground wheel 17. Material transferred by the conveyor 78 is thus discharged into the elevator 83, which then carries the material into a wagon or the like connected behind the corn picker machine.

The operation of the machine will be best understood in connection with Figs. 3 and 4. As the machine is advanced and the corn stalks 85 are cut by the cutter 43, the stalks slide downwardly and rearwardly on the cutter 43 by virtue of its upward and forward inclination. On the cutting of a stalk the weight of the ears tends to lean or tip the stalk in a direction depending upon the relative arrangement and weights of the ears on the stalk. However, because of the rearward and downward sliding of the stalks on the cutter 43, the lower end of the stalk is initially moved to the conveyor 39 regardless of the direction in which it tends to tip.

This guiding action of the sickle or cutter 43 is supplemented by the action of the reel 44 which functions to deflect the stalks on to the conveyor 39. Since the paddles 49, in their lowermost positions on the reel, are flat against their corresponding struts 48, the stalk guiding action of the reel is positive. The function of the swinging support of the paddles 49, between their uppermost and lowermost positions on the reel 44, comes into play prior to the cutting of the stalks by the sickle 43.

Thus it is well known that in corn picking ears are often times sufficiently ripe so that they fall to the ground when the stalk is hit with what may be called a solid impact, such as striking the stalk with a portion of the corn picking machine or a part of the tractor.

By virtue of the swinging support of the paddles 49 on the reel, the impact force of the paddles is gradually or yieldably applied on the stalks so as to eliminate or substantially reduce any sudden striking of the stalks by the reel. In other words, the stalks are initially moved in the direction of rotation of the reel and toward the cutter 43 at a speed slower than the reel travel through a time interval required for the movement of a paddle 49 from a position swung outwardly from its corresponding struts 48 to a position flat against the struts.

During the deflecting or guiding action of the reel on the stalks, the stalks have a tendency to slide longitudinally of the paddles 49 toward the ends of the reel 44. As a result, the stalks may be caught between the ends of the reel and the inner sides of the apron frame members 24 and 26. In order to eliminate this condition curved scoop members 87 are provided at opposite ends of the paddles 49 (Fig. 5). A scoop 87 is of a length to project outwardly from the leading edge of a corresponding paddle 49 and has the outer side 91 thereof curved upwardly and outwardly from the front side of a corresponding paddle. Thus any stalks which might slide longitudinally along the paddles 49 are held against moving outside of the longitudinal confines of the reel 44 so as to be positively directed on to the conveyor 39.

In one embodiment of the invention a paddle 49 is formed from wood stock about one inch thick and four inches wide. The scoop 87 is about six inches long and three inches wide with the curved portion 91 thereof being about one and one half inches long.

As shown in Fig. 3, the lower end 92 of the conveyor 39 forms, with the cutter 43, a substantially V-shaped trough 93, whereby stalks sliding downwardly and rearwardly on the cutter 43 are immediately acted upon by the conveyor 39. Further, any ears of corn which may be knocked from the stalks by the combined cutting action of the cutter 43 and guiding action of the reel 44 are prevented from accumulating on the top side of the cutter 43 and are carried away from the cutter by the conveyor 39. In other words, the lower end 92 of the conveyor 39 constitutes a moving side wall for the trough 93.

The cut stalks 94 travel head first upwardly on the conveyor 39. As these stalks approach the upper end of the conveyor 39 they are pressed downwardly against the conveyor by the action of the feeder roll 54. Any stalks that may be inclined in an upward and rearward direction from the conveyor 39 have their head or tassel portions engaged by an upward and forwardly inclined deflecting plate 96 located forwardly of the feeder roll 54 and supported between side frame members 35 and 40.

The pressing of the stalks 94 against the conveyor 39 by the feeder roll 54 deflects downwardly that portion of the conveyor below the feeder roll 54, as illustrated in dotted lines in Fig. 3. As a result, the stalks 94 are also bent downwardly so that as they pass off the conveyor 39 their head ends are extended upwardly and rearwardly, as indicated for the stalk 94a in Fig. 3. These head ends of the stalks are engaged by a curved guiding plate 97 arranged between the feeder roll 54 and the combination rolls 59, and supported on the side frame members 35 and 40. The deflecting plate 97 acts to direct the stalks between the combination snapping and husking rolls 59, with the rod members 60 on the rolls grabbing the stalk thus directed and feeding the stalk through the rolls.

Because of the relatively small size of the rolls 59, however, the rolls act to repel the ears of corn on the stalks and the rods, in combination with the rotational speed of the roll, feed both the stalks and the husks through the rolls. The husks are thus removed from the ears and the ears from the stalks by the single pair of rolls 59. It is contemplated that the rolls 59 be operated at a speed of at least 750 R. P. M.

The picked ears 98 (Fig. 3) drop downwardly through the space between the rolls 59 and the rear end of the conveyor 39 and on to the conveyor 78.

The fodder or picked stalks ejected by the rolls 59 are moved between the beater roll 63 and the concave 73 over the forward end of the concave 73 which is closely adjacent to and substantially opposite the lower one of the rolls 59. The fodder is concurrently agitated or beaten and fed by the angle or beater members 68 whereby to shake and separate any shelled corn therefrom. This shelled corn drops through the spaces between the slat members 76 and on to the conveyor 78. The shelled corn and the picked corn 98 are thus moved together from below the beater 63 and combination rolls 59 for discharge from the end 82 of the conveyor 78 and into the wagon elevator 83.

In order to separate any chaff or foreign material from the shelled corn and the picked corn, prior to its delivery to the wagon elevator 83, there is provided a blower 101 (Figs. 1 and 2) supported on the rear axle 16 forwardly of the upright frame 23. The blower discharge end 102 (Fig. 4) is located below the conveyor discharge end 82 and arranged to direct a blast of air laterally of the machine and toward the ground wheel 17. This blast of air acts on the material falling from the conveyor 78, so that the chaff is blown laterally outwardly to one side of the machine. The fodder from the beater roll 63 is discharged from the rear end of the machine to the ground (Fig. 3).

It is seen, therefore, that all of the shelled corn and all of the picked corn are completely harvested and delivered to a wagon or the like, and that all of the fodder and chaff material are delivered directly to the ground. By virtue of a six foot width of the cutter 43 and conveyor 39, it is unnecessary that the machine be carefully guided along the rows of corn to be picked since it is only necessary that a row of corn be positioned between the snouts or guides 29 at the front ends of the apron side walls 24 and 26.

In some instances of operation some stalks may fall from the conveyor 39 directly into the conveyor 78 without being acted upon by the combination husking and snapping rolls 59. For example some of the stalks may be of a short length, or some of them may not be deflected by the guiding plate 97, while others may tend to pass below the rolls 59 rather than between the rolls. In order to remove any ears of corn from stalks falling on the conveyor 78, a second pair of combination picking and husking rolls 105, extended longitudinally of the machine, are arranged laterally outwardly from the discharge end 82 of the conveyor 78 (Figs. 1 and 4). The rolls 105 are of a construction similar to the rolls 59 but are of a shorter length which corresponds to the width of the conveyor 78.

The rolls 105 are rotatably supported in bearing plates 106 mounted on the side walls 79 of the conveyor 78 and are in a vertically spaced relation above the lower end of the wagon elevator 83.

As shown in Fig. 4, the axis of the upper roll 105 is in a plane substantially common to the upper length of the inclined portion 80 of the conveyor 78. Since the stalks on passing off of the conveyor portion 80 tend to tip downwardly, this arrangement provides for the stalks entering between the rolls 105. To further guide the stalks between the rolls 105, a pivoted press plate 107 is pivoted at 108 on the side members 79 for the conveyor 78, inwardly from its discharge end 82, so that the free end 109 of the press plate 107 is ridable on the conveyor 78 at its discharge end.

The plate 107 is maintained against the conveyor 78 by the action of gravity and constitutes a movable top wall for the inclined conveyor section 80. The plate 107 tends to maintain the stalks in substantial longitudinal alignment with the upper length of the inclined conveyor section 80 so as to prevent the stalks tilting downwardly to a position below the rolls 105.

The rolls 105 act on the stalks in all ways similar to the action on the stalks by the combination rolls 59, with the fodder from the rolls 105 being discharged to the side of the corn picking machine rearwardly of the wheel 17 and with the corn picked thereby dropping directly into the lower end of the wagon elevator 83.

Power for operating the various operating units in the corn picking machine is supplied from the rear power take-off of a usual farm tractor. A drive shaft 110 (Figs. 1 and 6) is rotatably supported at its forward end in a bearing support 111 carried on the tongue structure 25. A usual type telescoping shaft unit 112 is connected between the front end of the power shaft 110 and the tractor rear power take-off.

The rear end of the drive shaft 110 is connected through a universal joint connection 113 with a shaft 114 forming part of a substantially T-shaped gear unit indicated generally at 115, which is mounted on the top of the upright frame 23. The shaft 114 is connected in the gear unit 115 with a rearwardly extended first driven shaft 116 rotatably supported in the front bearing plate 106 for the combination rolls 105. A second driven transverse shaft 117, suitably connected within the gear unit 115 in a driven relation with the shaft 114, extends inwardly of the corn picker machine in substantial coaxial alignment with the shaft 56 of the feeder roll 54, which is in a direct driven relation with the shaft 117.

Figure 6:
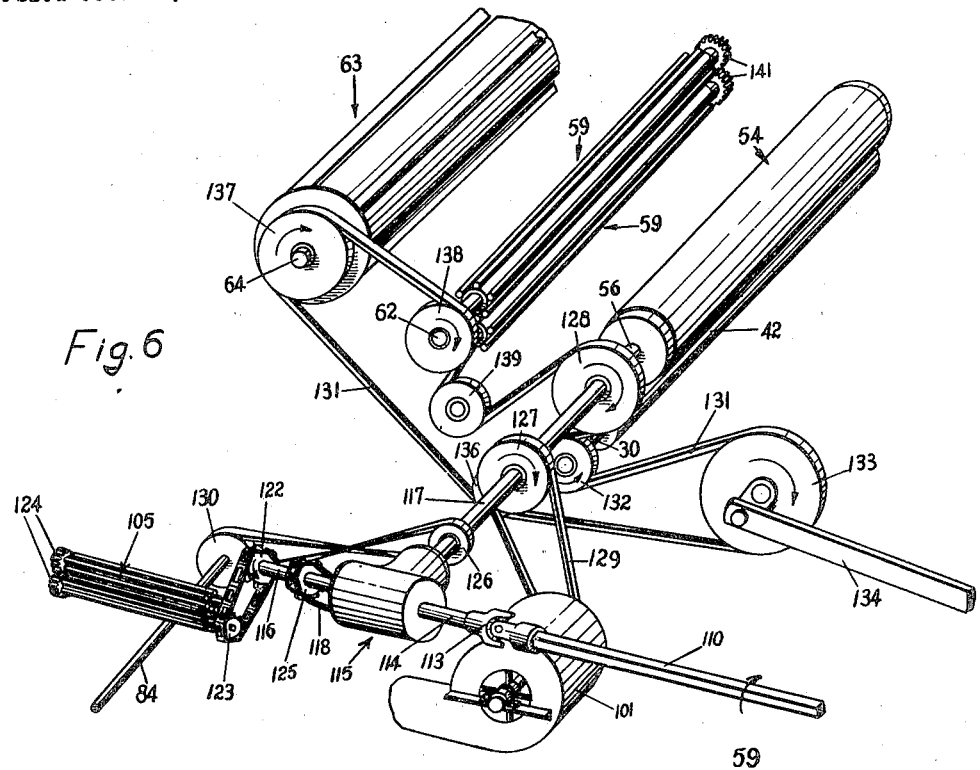
Fig. 6 is a diagrammatic perspective view showing the power transmission system for driving the various operating units in the corn picking machine.

The first driven shaft 116 carries a sprocket 125 connected through a sprocket chain 118 with a sprocket 119 mounted on the shaft 120 of the lower roll 121 of the transverse conveyor 78 (Figs. 2, 4 and 6). A second sprocket 122 mounted on the longitudinal driven shaft 116 is chain connected with a sprocket 123 mounted on the lower one of the combination rolls 105. The rolls 105 (Fig. 6) are in continuous connection through gears 124.

Axially spaced on the transverse driven shaft 117 (Fig. 6) between the feeder roll 54 and the gear unit 115 are pulleys 126, 127 and 128. The pulley 126 is belt connected with a pulley 130 mounted on a shaft 84 for the lower roll of the wagon elevator 83, and the fan 101 is connected through a belt 129 with the pulley 127.

The pulley 128 constitutes the drive pulley for the draper roll 42, the combination snapping and husking rolls 59, the beater roll 63 and the cutter 43. A single belt 131 travels from the pulley 128 about a drive pulley 132 mounted on the shaft 30 for the upper conveyor roll 42 (Figs. 1 and 6). From the pulley 132 the belt 131 travels about a pulley 133, rotatably supported on the apron side member 24 and adapted to operate a pitman 134 which is suitably connected with the cutter bar 43.

The belt 131 from the pulley 133, then travels rearwardly under a first idler pulley 136 for travel about a pulley 137 mounted on the beater roll shaft 64, and from the pulley 137 travels forwardly over a pulley 138 carried on the shaft 62 of the upper combination roll 59, and then downwardly about a second idler pulley 139 to the drive pulley 128. The idler pulley 139 is rotatably supported on the apron side member 24, and the combination rolls 59 are in continuous engagement through the provision of gears 141 mounted on their ends oppositely from the pulley 138.

The shaft 46 for the reel 44 has a sprocket 142 mounted at one of its ends (Figs. 1 and 2) which is connected through a chain 143 with a sprocket 144 rotatable with the ground wheel 17. The direction of rotation of the drive shaft 116 and the various operating units is indicated by arrows in Fig. 6.

From a consideration of the above description it is seen that the invention provides a corn picking machine which is efficient in operation to pick and husk corn with a minimum of damage to the corn, while harvesting a maximum of the corn to be picked. The machine is adapted to be pulled and operated from any usual type tractor now in general use, and in operation eliminates a careful guiding of the tractor relative to the rows of corn.

The machine is relatively light in weight and in one embodiment thereof has a total overall weight of about nine hundred pounds. All of the operating parts in the machine are easily and quickly accessible for maintenance and service purposes and require a minimum of power from the tractor. The machine in actual operation has outpicked commercial type pickers under identical working and weather conditions not only in the amount of corn harvested, but with a lesser amount of corn being shelled.

Although the invention has been described and illustrated with respect to a preferred embodiment thereof, it is to be understood that it is not to be so limited, since changes can be made therein which are within the full intended scope of this invention, as defined by the appended claims.

I claim:
1. A corn picking machine including a portable frame, a downwardly and forwardly inclined conveyor on said frame, a pair of upright side walls on said frame extended rearwardly beyond the top end of said inclined conveyor, stalk cutting means at the lower end of said conveyor, combination picking and husking rolls rotatably supported in said side walls rearwardly from the top end of said inclined conveyor, a feed roll rotatably supported in said side walls above the top end of said inclined conveyor, with said feed roll and inclined conveyor cooperating to direct the stalks from said inclined conveyor between said combination rolls, means carried between said side walls rearwardly of said combination rolls for separating shelled corn from the stalks and attached husks ejected by said combination rolls, and a transverse conveyor on said frame arranged below said combination rolls for receiving and carrying the picked corn and shelled corn from said transverse conveyor for discharge from the machine.

2. In a corn picking machine including a portable frame, a downwardly and forwardly inclined cut stalk carrying conveyor pivoted on said frame, stalk cutting means arranged forwardly of said conveyor, combination husking and picking rolls spaced rearwardly from the top end of said conveyor, a feeder roll above the top end of said conveyor, first guide means located forwardly of said feeder roll for directing cut stalks on said conveyor between said feeder roll and the top end of the conveyor, second guide means between said feeder roll and said combination rolls for directing cut stalks from said conveyor between said combination rolls, and means arranged rearwardly of said conveyor and below said combination rolls for receiving and discharging the picked corn from the machine.

3. In a corn picking machine including a conveyor for carrying cut stalks, a pair of combination picking and husking rolls arranged transversely of said conveyor at a position spaced rearwardly from the rear end of said conveyor, means for directing the stalks from said conveyor between said rolls, with each of said rolls including a cylindrical body member and a plurality of ribs extended axially of said body member in a parallel spaced relation, and means for operating said rolls at a speed of at least about seven hundred fifty (750) revolutions per minute, with said body members and axial ribs being relatively arranged and constructed so that a stalk with attached husks is admitted between the rolls, and with said ribs acting to eject the ears of corn from the husks as the husks enter between the rolls.

4. In a corn picking machine having an upwardly and rearwardly inclined conveyor for carrying cut stalks, a stalk cutting means at the lower end of said inclined conveyor, a pair of combination husking and picking rolls extended transversely of said inclined conveyor and spaced rearwardly from the upper end thereof, means for directing the cut stalks from said inclined conveyor between said rolls, a beater roll positioned rearwardly of said combination rolls and arranged in a parallel relation therewith, a concave of an open construction spaced below said beater roll, means for guiding the cut stalks and attached husks from said combination rolls between said concave and beater roll for separation of shelled corn therefrom, and a transversely extended conveyor apparatus arranged below said combination rolls and concave for receiving the corn picked by said combination rolls and the shelled corn dropping from said concave.

5. In a corn picking machine having an upwardly and rearwardly inclined longitudinally extended conveyor for carrying cut stalks, a stalk cutting means at the lower end of said longitudinal conveyor, combination husking and picking rolls arranged transversely of said longitudinal conveyor at a position spaced rearwardly from the upper end thereof, means spaced forwardly of said rolls for delivering the cut stalks from said longitudinal conveyor to said rolls, a transversely extended conveyor located below said rolls for receiving corn picked by said rolls and any stalks falling between said rolls and the upper end of said longitudinal conveyor, second combination husking and picking rolls arranged at the discharge portion of said transverse conveyor, and means for directing the stalks on said transverse conveyor through said second rolls.

GLEN W. STODDARD.

REFERENCES CITED

The following references are of record in the file of this patent:

UNITED STATES PATENTS

| Number | Name | Date |
|---|---|---|
| 265,575 | Carman | Oct. 10, 1882 |
| 388,150 | Reeves | Aug. 21, 1888 |
| 655,408 | Madsen | Aug. 7, 1900 |
| 773,530 | Sheasley | Oct. 25, 1904 |
| 1,034,152 | Skinner | July 30, 1912 |
| 1,346,931 | Adams | July 20, 1920 |
| 1,552,872 | Oppenheim et al. | Sept. 8, 1925 |
| 1,635,569 | Ayars | July 12, 1927 |
| 1,814,723 | MacGregor | July 14, 1931 |
| 2,177,317 | Green | Oct. 24, 1939 |
| 2,178,013 | Blank | Oct. 31, 1939 |
| 2,333,901 | Swenson | Nov. 9, 1943 |
| 2,344,235 | Crumb et al. | Mar. 14, 1944 |